United States Patent [19]

Tanaka et al.

[11] Patent Number: 5,304,351
[45] Date of Patent: Apr. 19, 1994

[54] SEMI-OVAL SHAPED CARRIER HAVING EXCELLENT THERMAL STRESS RESISTANCE AND THERMAL FATIGUE RESISTANCE FOR AUTOMOBILE EXHAUST GAS-PURIFYING CATALYST

[75] Inventors: Takashi Tanaka; Mikio Yamanaka, both of Futtsu; Yutaka Sadano, Hikari; Kouki Yotsuya, Chiyoda; Yasushi Ishikawa, Tokai; Toshihiro Takada, Toyota, all of Japan

[73] Assignees: Nippon Steel Corporation, Tokyo; Toyota Jidosha Kabushiki Kaisha, Toyota, both of Japan

[21] Appl. No.: 790,497

[22] Filed: Nov. 12, 1991

[30] Foreign Application Priority Data

Nov. 13, 1990 [JP] Japan ................... 2-306832

[51] Int. Cl.$^5$ .................. F01N 3/15; F01N 3/28
[52] U.S. Cl. .................. 422/180; 422/177; 422/211; 422/222; 55/498; 55/511; 55/524; 60/299; 60/322; 428/116
[58] Field of Search ............. 422/180, 177, 211, 222; 55/DIG. 30, 498, 511, 524; 60/299, 322; 502/439, 527; 428/116

[56] References Cited

U.S. PATENT DOCUMENTS

| | | | |
|---|---|---|---|
| 4,282,186 | 8/1981 | Nonnenmann et al. | 422/180 |
| 4,647,435 | 3/1987 | Nonnenmann | 422/180 |
| 4,795,615 | 1/1989 | Cyron et al. | 422/179 |
| 4,832,998 | 5/1989 | Cyron | 428/116 |
| 4,847,966 | 7/1989 | Kuchelmeister | 502/439 |
| 4,948,353 | 8/1990 | Maus et al. | 422/180 |

FOREIGN PATENT DOCUMENTS

| | | |
|---|---|---|
| 0351841 | 1/1990 | European Pat. Off. |
| 0389645 | 10/1990 | European Pat. Off. |
| 160728 | 10/1987 | Japan |
| 162329 | 10/1987 | Japan |
| 273052 | 11/1987 | Japan |
| 22319 | 12/1987 | Japan |
| 194436 | 12/1987 | Japan |
| 36842 | 2/1988 | Japan |

Primary Examiner—James C. Housel
Assistant Examiner—N. Bhat
Attorney, Agent, or Firm—Kenyon & Kenyon

[57] ABSTRACT

A semi-oval shaped metallic carrier having an excellent thermal stress resistance and thermal fatigue resistance and used for an automobile exhaust gas-purifying catalyst, in which the carrier is composed of a metallic honeycomb body constituted by superimposing flat metal foils and corrugated metal foils one on the other and winding them together, and a metallic jacket enclosing the lateral face of the honeycomb body, the transverse section of the metallic carrier constituting the parallel portions and semi-circular arc portions and the honeycomb body is joined to the jacket mainly at the semi-circular arc portions or at the parallel portions of the honeycomb body.

6 Claims, 4 Drawing Sheets

SEMI-OVAL SHAPED CARRIER HAVING EXCELLENT THERMAL STRESS RESISTANCE AND THERMAL FATIGUE RESISTANCE FOR AUTOMOBILE EXHAUST GAS-PURIFYING CATALYST

BACKGROUND OF THE INVENTION

1. Title of the Invention

The present invention relates to semi-oval-shaped (i.e., a shape having parallel portions and semi-circular arc portions at each end thereof) metallic carrier having an excellent thermal stress resistance and thermal fatigue resistance and used for supporting an automobile exhaust gas-purifying catalyst.

The most common type of carrier for supporting an automobile exhaust gas-purifying catalyst is formed as a honeycomb body consisting of superimposed flat metal foils (hereinafter referred to as "flat foils") and corrugated metal foils (hereinafter referred to as "corrugated foils") made of a heat resistant stainless steel, and wound together. The cross section of the carrier is usually circular, but there is a great demand for a semi-oval-shaped metallic carrier, because such a carrier is often mounted while surrounding a part of an engine.

Such metallic carriers must be able to withstand a thermal stress and thermal fatigue caused by a heat cycle dependent on heating and cooling treatments and a temperature distribution difference in a honeycomb body. When such a metallic carrier is subjected to the heat cycle, there occurs a large temperature difference between the jacket enclosing the honeycomb body and the outermost corrugated foil of the honeycomb body, and accordingly, a large thermal stress is developed on the outermost corrugated foil. Therefore, a means for suppressing this thermal stress becomes necessary, to enable the honeycomb body to be fixed to the jacket.

As described in, for example, Japanese Unexamined Utility Model Publication Nos. 61-162329 and 62-160728, a method is known of fixing a honeycomb body by folding down a jacket at the end face of the honeycomb body. In this method, the jacket and the honeycomb body are not joined together between the end faces, and thus no thermal stress is caused by a binding of the jacket.

Nevertheless, since the jacket is fixed to the honeycomb body at the end face thereof the honeycomb body is often ruptured due to the vibration of the engine or a thermal expansion elongation difference between the honeycomb body and the jacket, and if a thermal stress is repeatedly imposed on the carrier, a gap is gradually produced between the jacket and the honeycomb body, and the carrier becomes loose at that joint. Once the carrier becomes loose at that joint, the rupture of the honeycomb body becomes more and more severe, and the gap between the jacket and the honeycomb body becomes larger. As a result, the honeycomb body is vibrated and banged against the jacket, and the shock of such impacts causes the supporting slurry to fall from the catalyst, to thereby lower the purification capability of the catalyst.

Further, as disclosed in Japanese Unexamined Patent Publications Nos. 63-36842 and 62-273052, a method is known of fixing a honeycomb body by passing a pin through the honeycomb body or by fixing a plate therein. In this method, however, since the pin or plate is placed in the honeycomb body, these objects are deformed when exposed to very high temperatures, and thus lose their ability to fix the honeycomb body, and as a result, the honeycomb body is separated from the jacket, to thereby worsen the condition of the engine.

Furthermore, as disclosed in Japanese Unexamined Utility Model Publication No. 63-22319, a method is also known of fixing a honeycomb body by protuberances provided on the inner surface of a jacket. In this method, however, when a heat cycle is repeated, the honeycomb body crumbles at the protruding portions, whereby gaps are formed between each of the protuberances and the honeycomb body, and thus the fitting of the honeycomb body becomes loose.

As described above, none of the mechanically fixing methods can avoid an unstable fitting, and thus the efficiency of the metallic carrier is low.

The gist of the device described in Japanese Unexamined Utility Model Publication No. 62-194436 is a suppression of the binding between a honeycomb body and a jacket at an axial-directional open end, by joining them at a cross-sectional part of the honeycomb body, and in the examples of this publication, the jacket is joined to the honeycomb body by brazing. Although this method is useful for the suppression of stress developed in the axial direction, it is of no use for a suppression of stress developed in the radial direction, in cross section. In particular, when a radius in the direction of a major axis is long, as in a semi-oval-shaped carrier, the suppression of stress in the radial direction becomes important. In a method such as disclosed in Japanese Unexamined Utility Model Publication No. 62-194436, the thermal stress applied to a honeycomb body cannot be sufficiently suppressed, and a large thermal stress is imposed at the outermost corrugated foil of the honeycomb body, at which the honeycomb body is joined to a jacket, and thus the outermost corrugated foil is broken and becomes separated from the jacket.

U.S. Pat. No. 4,795,615 discloses a technique for joining a honeycomb body and a jacket, the object of this technique being to avoid an elongation in an axial direction of the honeycomb body from the jacket. Also, in this technique the locations of the junctions between the foils of the honeycomb body and between the honeycomb and the jacket are not duplicated in the axial directions.

Nevertheless, in a semi-oval-shaped carrier, a difference of the length of the major axis and the minor axis becomes large, and a deformation of the honeycomb body during a heat cycle is different at the major axis and at the minor axis, and thus a large thermal stress is imposed at the junction between the jacket and the honeycomb body, whereby the outermost corrugated foil thereof is broken and becomes separated from the jacket. This problem is not solved by a location of one junction between the jacket and the honeycomb body.

As described above, in the conventional techniques for fixing a jacket and honeycomb body to each other, the defects mentioned above cannot be overcome, and thus the true efficiency of a metallic carrier cannot be exhibited.

SUMMARY OF THE INVENTION

Therefore, an object of the present invention is to provide a semi-oval-shaped metallic carrier capable of suppressing any thermal stress caused during a heat cycle of an engine, and preventing a looseness of the fitting between the jacket and honeycomb body or a separation therebetween.

According to the present invention, the jacket and honeycomb body of a semi-oval-shaped carrier are joined to each other mainly at the arc portions or parallel portions of the carrier, whereby a thermal stress imposed on the honeycomb body is suppressed and a separation of the jacket and honeycomb body is prevented, whereby a loose fit between the jacket and honeycomb body is avoided and they are joined together without employing a mechanical fixing method.

The present invention is based on the principle that, in a semi-oval-shaped carrier, the temperature distribution in the direction of the major axis of the carrier is different from that in the minor axis, and that the flexibility of a semi-oval-shaped honeycomb body is greater at the parallel portions than at the circular arc portion.

When an exhaust gas flows into a semi-oval-shaped carrier, when the flow rate of the exhaust gas is greater in the direction of the minor axis of the semi-oval-shaped honeycomb body than in the direction of the major axis thereof the temperature rises more rapidly thereat and becomes higher than in the direction of the major axis, and accordingly, temperature variations at the outermost parts of the parallel portions are greater. Further, in the circular arc portions in the direction of the major axis of the carrier, the temperature does not become as high as in the parallel portions, and thus the temperature variations are not so great. Accordingly, the circular arc portions are not exposed to such high a temperature as the parallel portions, and therefore, in the circular arc portions, the strength of the material is not lowered, and since the temperature variations are small in the circular arc portions, the thermal stress imposed thereat is lower. When the jacket and honeycomb body are formed only at the circular arc portions according to the principle described above, the high temperature strength of the honeycomb body at the portions thereof joined to the jacket is higher than that in the parallel portion thereof, and accordingly, the honeycomb body is not so easily broken, and thus the breakdown of the honeycomb body proceeds more slowly, whereby a separation of the honeycomb body from the jacket can be prevented.

Further, when determining the flexibility of a semi-oval-shaped honeycomb body, based on its shape, the degree of freedom of the honeycomb body with respect to radial expansion and shrinkage becomes very large in the parallel portions, due to the corrugated foils. Conversely, the circular arc portions have a lower degree of freedom than the parallel portions with regard to the radial expansion and shrinkage, because the expansion and shrinkage of the honeycomb body are restricted by the curvature of the circular arc portions.

As is clear from the above description, if a semi-oval-shaped honeycomb body is joined to a jacket mainly at the parallel portions of the honeycomb body, the honeycomb body becomes more flexible, the development of thermal stress is lessened, and the honeycomb body is not easily separated from the jacket. The efficiency of the joining of the honeycomb body to the jacket of the parallel portions is exhibited, however, only when the temperature of the outermost layer of the parallel portions does not become too high. Namely, when the temperature of the exhaust gas is about 800° C., the temperature of the parallel portions does not become too high and the strength of the material is not lowered, and thus a joining mainly at the parallel portions is effective. The advantage gained by joining the honeycomb body to the jacket mainly at the parallel portions of the honeycomb body is that the junction becomes more stable and the carrier productivity becomes higher than when the joining is effected mainly at the circular arc portions. Accordingly, considering that, where a carrier is used at a comparatively low temperature (an exhaust gas temperature of about 800° C.), the temperature of the honeycomb body joined to the jacket does not become too high, it is more advantageous in view of the carrier manufacturing stability to join the honeycomb body to the jacket mainly at the parallel portions of the honeycomb body, to thereby suppress the occurrence of thermal stress by utilizing the flexibility of the honeycomb body. Also, when the joining of the honeycomb body and jacket is effected mainly at the parallel portions of the honeycomb body, no gap is formed between the outermost layer of the honeycomb body and the jacket, even if the jacket is deformed, and thus the purification capability of the catalyst is not lowered. On the other hand, when the exhaust gas temperature becomes comparatively high, it is preferable to join the honeycomb body to the jacket mainly at the semi-circular arc portions of the honeycomb body. The joining operation embodying the gist of the present invention can be effected by a method such as brazing, diffused joining, resistance welding, laser welding, electron beam welding or arc welding. The joining operation of the present invention is most easily realized by brazing. Also, the present invention functions in the same way as described above with regard to a carrier having an elliptic section.

The portions at which the jacket and the honeycomb body are joined comprise at least half the length of the parallel portions or circular arc portions to the full, or slightly more than the full, length thereof.

Namely, the present invention is related to the location of junctions between the jacket and the honeycomb body, i.e., the joining of the jacket and honeycomb body in accordance with the present invention effectively holds the carrier under all engine running conditions.

Figure 1A:
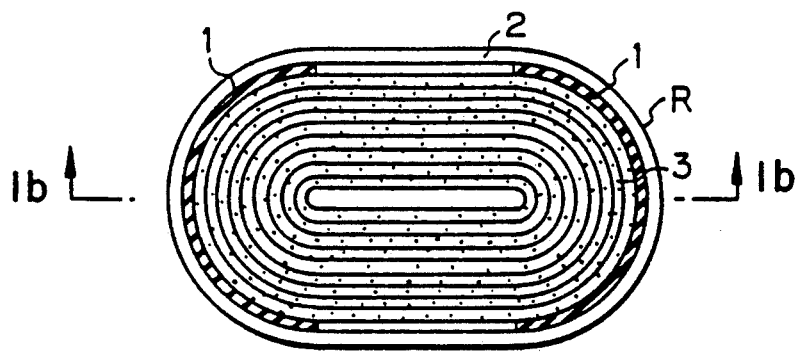
FIG. 1a, 1b, 2a, 2b, 3a, 3b, 4a and 4b illustrate embodiments of the present invention, respectively wherein section (a) is a structural plane view of a carrier, and section (b) is a structural longitudinal sectional view taken along a line A—A of (a)

The dots in the drawings show brazed portions of the foils of the honeycomb body and the shaded hatched lines show brazed portions of the jacket and the honeycomb body.

DESCRIPTION OF THE PREFERRED EMBODIMENTS

The embodiments of the present invention are now explained with reference to the drawings, wherein each of the drawings shows a typical view of a plane or longitudinal section of a carrier.

In these embodiments the joining is made by brazing, and hatched regions therein represent brazed parts.

Embodiment 1

Figure 1B:
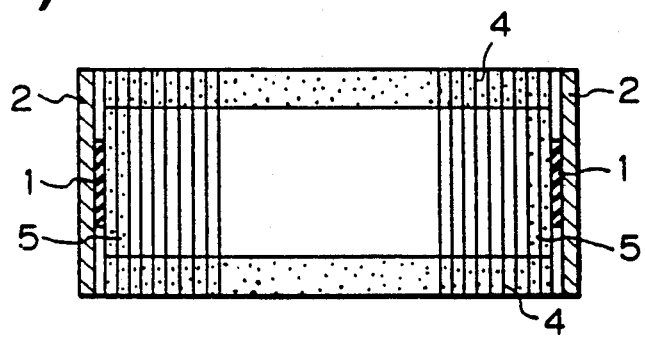

As illustrated in FIG. 1, a jacket 2 and a honeycomb body 3 joined by brazing 1 mainly at the circular arc portions R. The brazing 1 of the honeycomb body provides a carrier in which the full axial length part 5 from the outermost layers to the second layers and both end face portions 4 and 4, are brazed as shown by the dots in FIGS. 1(a) and (b). The full length brazed part 5 is herein referred to as "outer circumferential reinforcing region", and is arranged such that the brazing 1 between the honeycomb body and the jacket does not overlap the brazed end face portions 4 and 4 in the axial direction.

The metallic carrier having the brazed structure as described above was subjected to an engine heat cycle test which the metallic carrier was heated at an exhaust gas temperature of 850° C. and then cooled to a temperature of 100° C.

The engine test was repeated 900 times, and the metallic carrier then taken out and examined, and no separation of the jacket 2 and the honeycomb body 3 was observed.

Embodiment 2

Figure 2A:
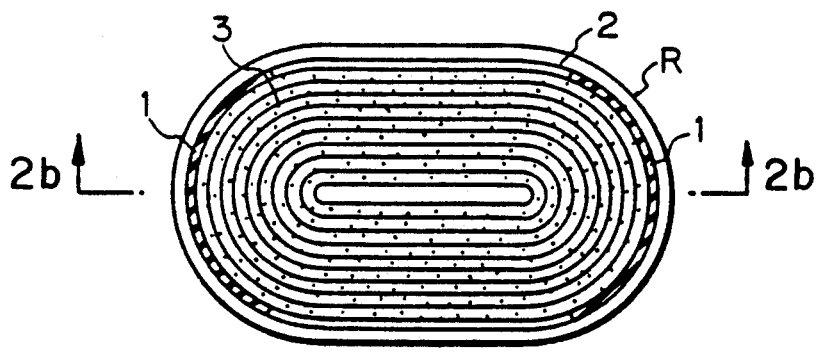
Figure 2B:
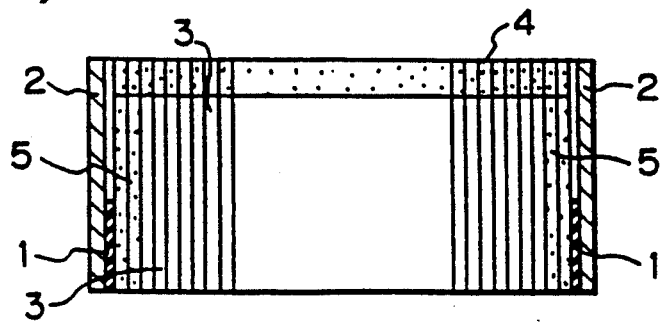

As illustrated in FIG. 2 the brazing of the jacket 2 to the honeycomb body 3 was conducted at the circular arc portions having sector angles of 120 degrees at one side. In the honeycomb body 3, the end face portion brazing 4 is effected only at the exhaust gas inlet side and only two layers of the outer circumferential reinforcing regions are brazed. Namely, contrary to the brazing structure of the honeycomb body as described above, it is advantageous for a suppression of stress to effect the brazing of the jacket and honeycomb body at the exhaust gas outlet side.

Also, in this embodiment, the metallic carrier was subjected to the same engine heat cycle test as described in Embodiment 1, and after the test was repeated 900 times, no separation or looseness of the joints was observed.

Embodiments 3 and 4

Figure 3A:
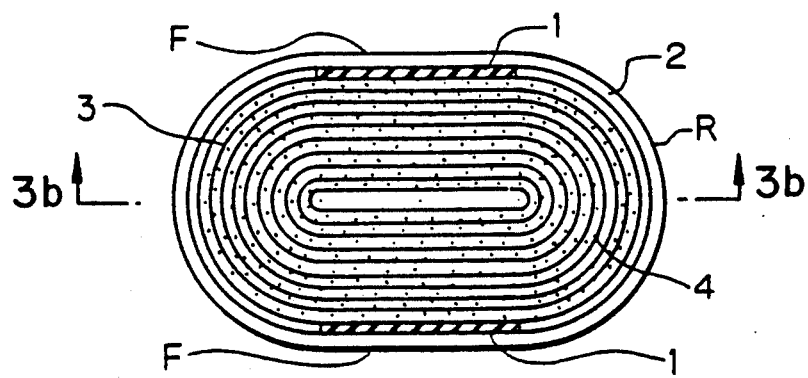
Figure 3B:
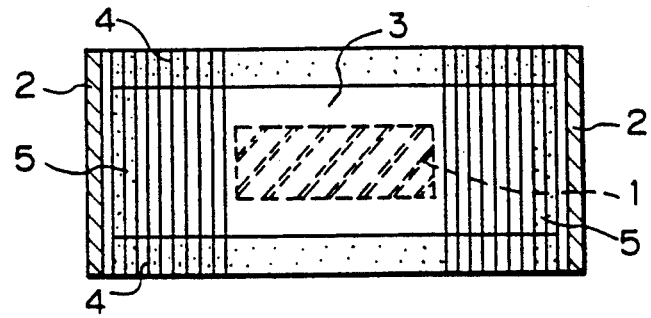
Figure 4A:
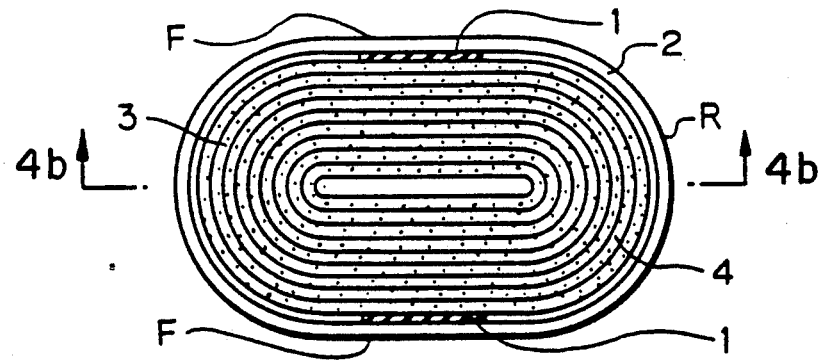
Figure 4B:
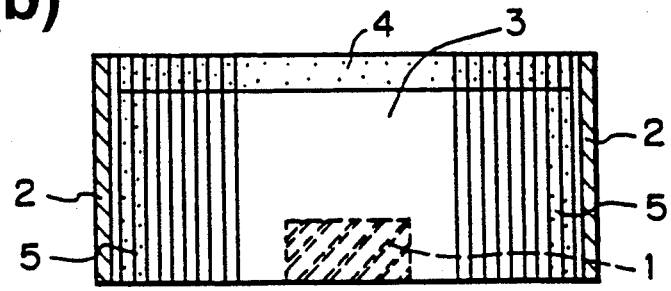

As shown in FIGS. 3(a) and (b) or FIGS. 4(a) and (b), the honeycomb body 3 and the jacket 2 are brazed together mainly or only at the parallel portions E and F of the honeycomb body 3. When these carriers were subjected to an engine test at an exhaust gas temperature of 800° C., no separation or looseness of the joints was observed. When the exhaust gas temperature was elevated to 850° C., however, the flat and corrugated foils in the outer circumferential reinforcing region at which the jacket and honeycomb body were joined were broken, and thus a looseness existed at the joint therebetween after the engine test was repeated 600 times.

Embodiment 5

Figure 5A:
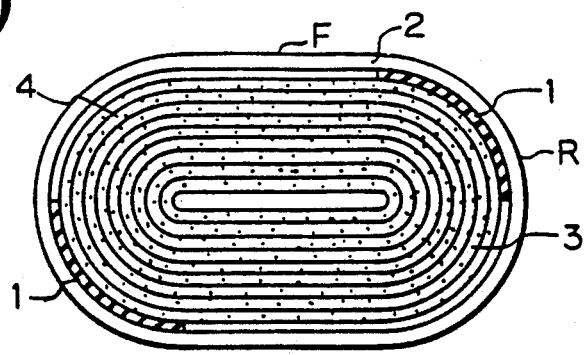
FIGS. 5(a), 5(b), 5(c) and 5(d) illustrate a plane view of other examples of the present invention.
Figure 5B:
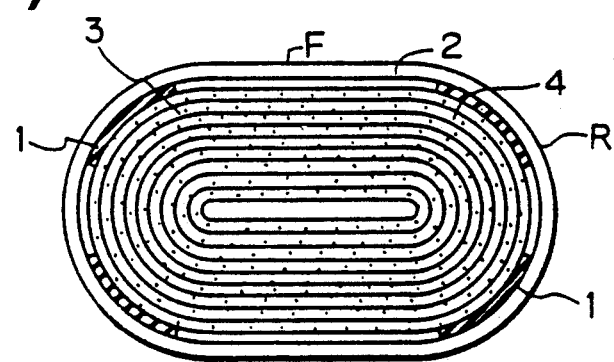

As shown in FIGS. 5(a), (b), (c) and (d), the honeycomb body 3 and the jacket 2 are brazed together at symmetrical points inclined from one another (FIGS. 5(a) and (c)), or are brazed together at a division thereof.

Figure 5C:
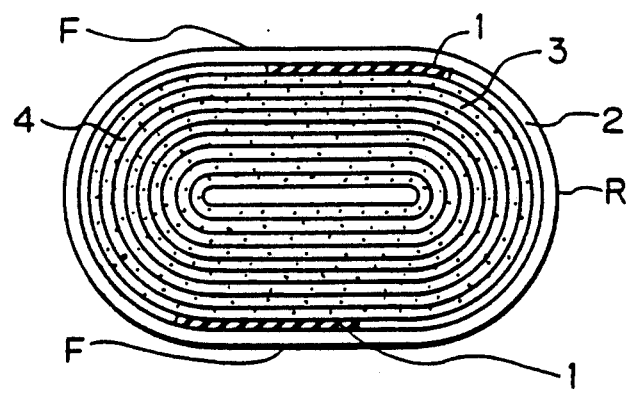
Figure 5D:
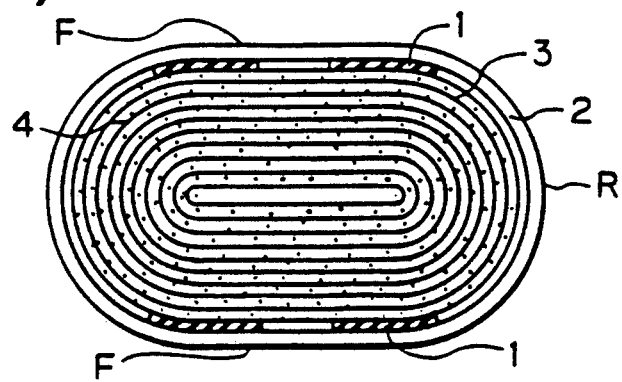

Also, in this embodiment, the metallic carrier was subjected to the same engine heat cycle test as described in Embodiment 1 except that an exhaust gas temperature of 800° C. was used in the embodiment shown in FIGS. 5(c) and (d), and even after the test was repeated 900 times, no separation or looseness of the joints was observed.

Comparative Example

Figure 6A:
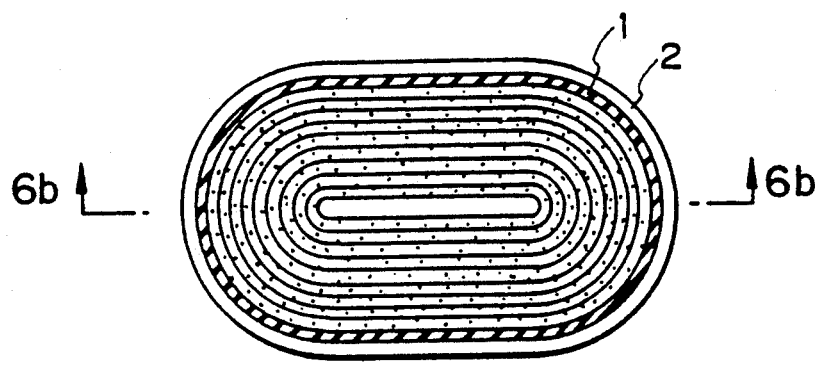
FIGS. 6(a) and 6(b) illustrate a comparative example.
Figure 6B:
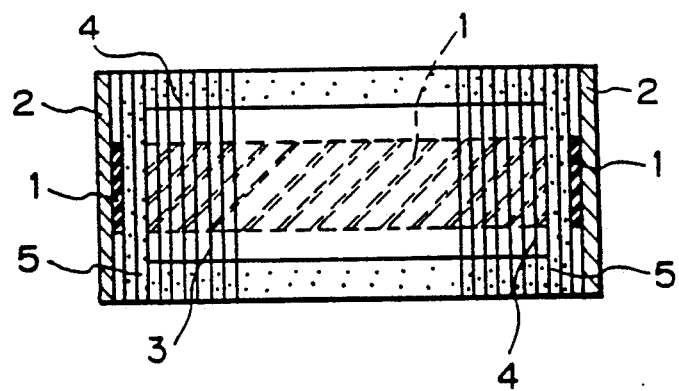

The Comparative Example 1 shown in FIGS. 6(a) and (b) has the same brazing structure of the honeycomb body 3 as in Embodiment 1, except that the brazing 1 of the jacket and the honeycomb body is made over the entire circumference of the carrier. When this carrier was subjected to an engine test at an exhaust gas temperature of 850° C., the honeycomb body was broken not only at the brazed portions parallel to the jacket but also at the circular arc portions, and the joints became loose. When the jacket and honeycomb body were brazed together along the entire circumference thereof, the stress between the jacket and honeycomb body could not be released, and the entire brazed portion of the jacket was broken.

As shown by the above description, according to the present invention, in a semi-oval-shaped metallic carrier, the jacket and honeycomb body are joined at the circular arc portions or at the parallel portions of the honeycomb body, whereby any thermal stress existing between the jacket and honeycomb body is suppressed whereby a separation of the honeycomb body from the jacket can be prevented, and simultaneously, a looseness of the carrier can be avoided. In the present invention, the area at which the jacket is joined to the honeycomb body is reduced, and the amount of brazing filler material required can be decreased, and thus a semi-oval-shaped carrier able to withstand thermal stress can be manufactured at a low cost.

We claim:

1. A metallic carrier with an oval type transverse cross-section having an excellent thermal stress resistance and thermal fatigue resistance used for an automobile exhaust gas-purifying catalyst, comprising:

a metallic honeycomb body having a lateral face constituted by superimposing flat metal foils and corrugated metal foils one on the other and then winding them together and a metallic jacket enclosing the lateral face of said honeycomb body, the metallic carrier being composed of the metallic honeycomb body joined to the metallic jacket, the transverse cross section of said metallic carrier constituting parallel portions and semi-circular arc portions wherein said honeycomb body is joined to said jacket substantially only at said semi-circular arc portions of said honeycomb body.

2. A metallic carrier according to claim 1, wherein said honeycomb body is joined to said jacket only at said semi-circular arc portions.

3. A metallic carrier according to claim 1, wherein said jacket has a circumferential length, and wherein said honeycomb body is joined to said jacket over a small portion more than an entire circumferential length of said semi-circular arc portions.

4. A metallic carrier with an oval type transverse cross-section having an excellent thermal stress resistance and thermal fatigue resistance used for an automobile exhaust gas-purifying catalyst, comprising:

a metallic honeycomb body having a lateral face constituted by superimposing flat metal foils and corrugated metal foils one on the other and then winding them together and a metallic jacket enclosing the lateral face of said honeycomb body, the metallic carrier being composed of the metallic honeycomb body joined to the metallic jacket, the transverse cross section of said metallic carrier constituting parallel portions and semi-circular arc portions wherein said honeycomb body is joined to said jacket substantially only at said parallel portions of said honeycomb body.

5. A metallic carrier according to claim 4, wherein said honeycomb body is joined to said jacket only at said parallel portions of said honeycomb body.

6. A metallic carrier according to claim 4, wherein said jacket has a circumferential length, and wherein said honeycomb body is joined to said jacket over a small portion more than an entire circumferential length of said parallel portions.

* * * * *